R. MANSLEY.
Making Oakum.

No. 22,662.

Patented Jan'y 18, 1859.

Witnesses:
Henry Howson
Horace See

Inventor:
Richard Mansley

UNITED STATES PATENT OFFICE.

RICHARD MANSLEY, OF PHILADELPHIA, PENNSYLVANIA.

IMPROVEMENT IN MACHINERY FOR TARRING OAKUM.

Specification forming part of Letters Patent No. 22,662, dated January 18, 1859.

*To all whom it may concern:*

Be it known that I, RICHARD MANSLEY, of the city and county of Philadelphia, and State of Pennsylvania, have invented a new and Improved Apparatus for Tarring Oakum; and I do hereby declare the following to be a full, clear, and exact description of the same, reference being had to the accompanying drawings, and to the letters of reference marked thereon.

My invention consists in the employment for tarring oakum of a perforated vessel or box placed within a stationary vessel containing a mixture of tallow, tar, and water, or other compounds used in the manufacture of oakum, a jet of steam being admitted to the bottom of the said stationary vessel, while a reciprocating motion is imparted to the perforated vessel, which contains the hemp or tow. The latter is thus thoroughly and rapidly impregnated with the contents of the stationary vessel and converted into oakum.

In order to enable others to practice my invention, I will now proceed to describe the manner in which I carry it into effect.

Figure 1:
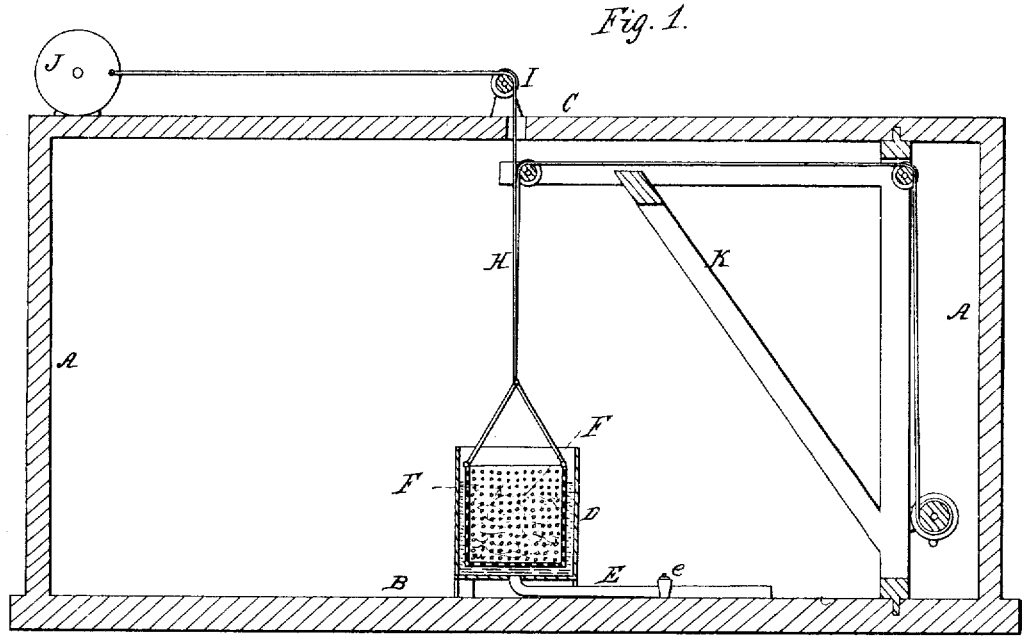
Figure 2:
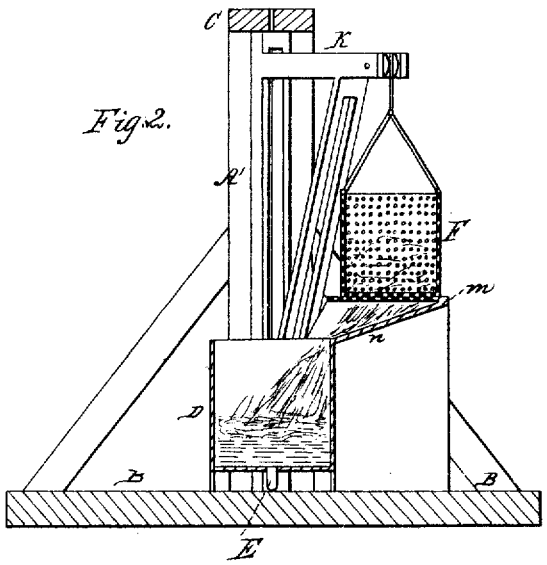

On reference to the accompanying drawings, which form a part of this specification, Figure 1 is a sectional elevation of an apparatus for carrying out my improved mode of manufacturing oakum; Fig. 2, a transverse sectional elevation on the line 1 2, Fig. 1.

Two vertical posts, A and A', are erected on a foundation or floor, B, and connected together at the top by a longitudinal beam, C. On the foundation is placed a vessel, D, open at the top and closed at the bottom, with the exception of a small central opening for the admission of the bent end of the steam-pipe E, which communicates with any adjacent steam-boiler, and which is furnished with a suitable stop-cock, c, for regulating the admission of steam to the vessel D. Another vessel, F, of the same form, but somewhat less in size than the vessel D, is suspended within the latter at the end of a rope or chain, H, which passes through a hole in the longitudinal beam C over the pulley I, which turns on brackets secured to the beam, and thence to a pin on the crank-wheel J, which is caused to revolve in brackets attached to the longitudinal beam C, thus imparting a vertical reciprocating motion to the vessel F. The latter may be made of perforated metal plates or of wire-netting, so that the compound contained in the vessel D may have free access to the contents of the vessel F.

K is an ordinary crane, the stem of which is arranged to turn above in the beam C and below in the foundation B. This crane is so situated that its rope or chain may be brought to coincide with that attached to the vessel F, when it becomes necessary to unhook one and attach the other.

The vessel D is nearly filled with a mixture of tallow, tar, and water—the composition usually employed in the manufacture of oakum. A mass of tow or hemp is placed in the inner vessel, F, the steam allowed to pass into the bottom of the outer vessel, D, and the crank-wheel J caused to turn. The contents of the outer vessel boiled together, thoroughly amalgamated and agitated by the action of the jet of steam, pass through the perforations of the inner vessel, and penetrate through its contents. The reciprocating motion imparted to the perforated vessel F and its constant ascent and descent in the liquid contents of the outer vessel tend to continually change the position of the tow, which soon becomes thoroughly impregnated with the composition and ready for use as oakum. The rope H is then unhooked, and the rope of the crane attached to the vessel F, so that the latter, with its contents, may be hoisted up clear of the outer vessel, and, by swinging the crane partially round, may be deposited on a perforated platform, *m*, which, with an inclined plane, *n*, is erected on the foundation B, adjacent to and above the top of the vessel D. The liquid becomes gradually drained from the tow, passes through the perforated platform *m*, and returns to the vessel D down the inclined plane *n*.

The tow, which, by the above process, has become oakum of a superior quality, after being partially dried, is slightly twisted, so as to assume the shape best adapted for use in calking vessels.

The above apparatus, although applicable to the tarring of oakum generally, is more especially intended for use in the hemp-growing districts, where the short fibers or tow are rejected as worthless for any but the most common purposes.

I claim and desire to secure by Letters Patent—

The perforated vessel F, or its equivalent, placed within a stationary vessel, D, which contains the compound for tarring oakum, a jet of steam being admitted to the stationary vessel, while a reciprocating motion is imparted to the perforated vessel, as and for the purpose herein set forth.

In testimony whereof I have signed my name to this specification in the presence of two subscribing witnesses.

RICHARD MANSLEY.

Witnesses:
 HENRY HOWSON,
 HENRY ODIORNE.